US012244220B2

(12) United States Patent
Olmos et al.

(10) Patent No.: US 12,244,220 B2
(45) Date of Patent: Mar. 4, 2025

(54) LOW FREQUENCY OUTPUT RIPPLE CANCELATION FOR A POWER SUPPLY

(71) Applicant: ABL IP Holding LLC, Atlanta, GA (US)

(72) Inventors: Eliseo Carcamo Olmos, Nuevo Leon (MX); Amin de la Cruz Oseguera, Nuevo Leon (MX); Juan Antonio Aqui Tapia, Nuevo Leon (MX)

(73) Assignee: ABL IP Holding LLC, Atlanta, GA (US)

( * ) Notice: Subject to any disclaimer, the term of this patent is extended or adjusted under 35 U.S.C. 154(b) by 518 days.

(21) Appl. No.: 17/581,215

(22) Filed: Jan. 21, 2022

(65) Prior Publication Data

US 2023/0238877 A1    Jul. 27, 2023

(51) Int. Cl.
| | |
|---|---|
| H02M 1/14 | (2006.01) |
| H02M 1/00 | (2007.01) |
| H02M 1/42 | (2007.01) |
| H02M 3/00 | (2006.01) |
| H05B 45/37 | (2020.01) |

(52) U.S. Cl.
CPC ......... *H02M 1/143* (2013.01); *H02M 1/0095* (2021.05); *H02M 1/4225* (2013.01); *H02M 3/015* (2021.05); *H05B 45/37* (2020.01); *H02M 1/008* (2021.05)

(58) Field of Classification Search
CPC .... H02M 1/143; H02M 1/008; H02M 1/4225; H02M 1/0095; H02M 3/015; H05B 45/37
See application file for complete search history.

(56) References Cited

U.S. PATENT DOCUMENTS

| | | | |
|---|---|---|---|
| 9,306,461 B2 | 4/2016 | Chang et al. | |
| 9,419,510 B2 | 8/2016 | Liu | |
| 9,730,280 B2 | 8/2017 | Lynch | |
| 9,800,135 B2 | 10/2017 | Lee et al. | |
| 9,839,080 B2 | 12/2017 | Zhou et al. | |
| 2013/0313974 A1 | 11/2013 | Fan et al. | |
| 2014/0091718 A1* | 4/2014 | Brinlee | H05B 45/39 363/16 |
| 2014/0354186 A1 | 12/2014 | Sun et al. | |
| 2015/0084527 A1 | 3/2015 | Siu et al. | |
| 2015/0381028 A1 | 12/2015 | Yao et al. | |
| 2015/0381054 A1 | 12/2015 | Chang et al. | |

(Continued)

FOREIGN PATENT DOCUMENTS

| | | |
|---|---|---|
| CN | 103298218 A | 9/2013 |
| CN | 203748073 U | 7/2014 |
| CN | 204392623 U | 6/2015 |

(Continued)

*Primary Examiner* — Jue Zhang
(74) *Attorney, Agent, or Firm* — Kilpatrick Townsend & Stockton LLP (57) ABSTRACT

A method for reducing current ripple at an output of a power supply includes sensing an alternating current (AC) input voltage waveform; determining a correction factor for a switching frequency of the power supply based on the sensed AC input voltage; and applying the correction factor to the switching frequency of the power supply to modify the power supply switching frequency. A modification of the switching frequency synchronizes the switching frequency of the power supply to the AC input voltage waveform.

20 Claims, 7 Drawing Sheets

(56) References Cited

U.S. PATENT DOCUMENTS

| | | |
|---|---|---|
| 2016/0338158 A1 | 11/2016 | Zhou et al. |
| 2016/0380537 A1* | 12/2016 | Bizjak ............... H02M 1/36 |
| | | 323/271 |

FOREIGN PATENT DOCUMENTS

| | | |
|---|---|---|
| CN | 105917740 A | 8/2016 |
| WO | 2011056068 A2 | 5/2011 |
| WO | 2016197971 A1 | 12/2016 |

* cited by examiner

LOW FREQUENCY OUTPUT RIPPLE CANCELATION FOR A POWER SUPPLY

BACKGROUND

Unless otherwise indicated herein, the materials described in this section are not prior art to the claims in this application and are not admitted to being prior art by inclusion in this section.

Light Emitting Diode (LED) lighting is increasingly replacing traditional incandescent lamps. The power source for the LED lighting may be an alternating-current (AC) power source such as the power provided by an electric utility. The AC power may be converted to direct current (DC) power, for example using a rectifier bridge and a power converter, to drive the LED lighting elements. A residual of the AC power input may appear on the DC power output as ripple related to the AC power frequency. Output current ripple is typically limited by industrial lighting standards in order to prevent LED degradation.

Figure 1:
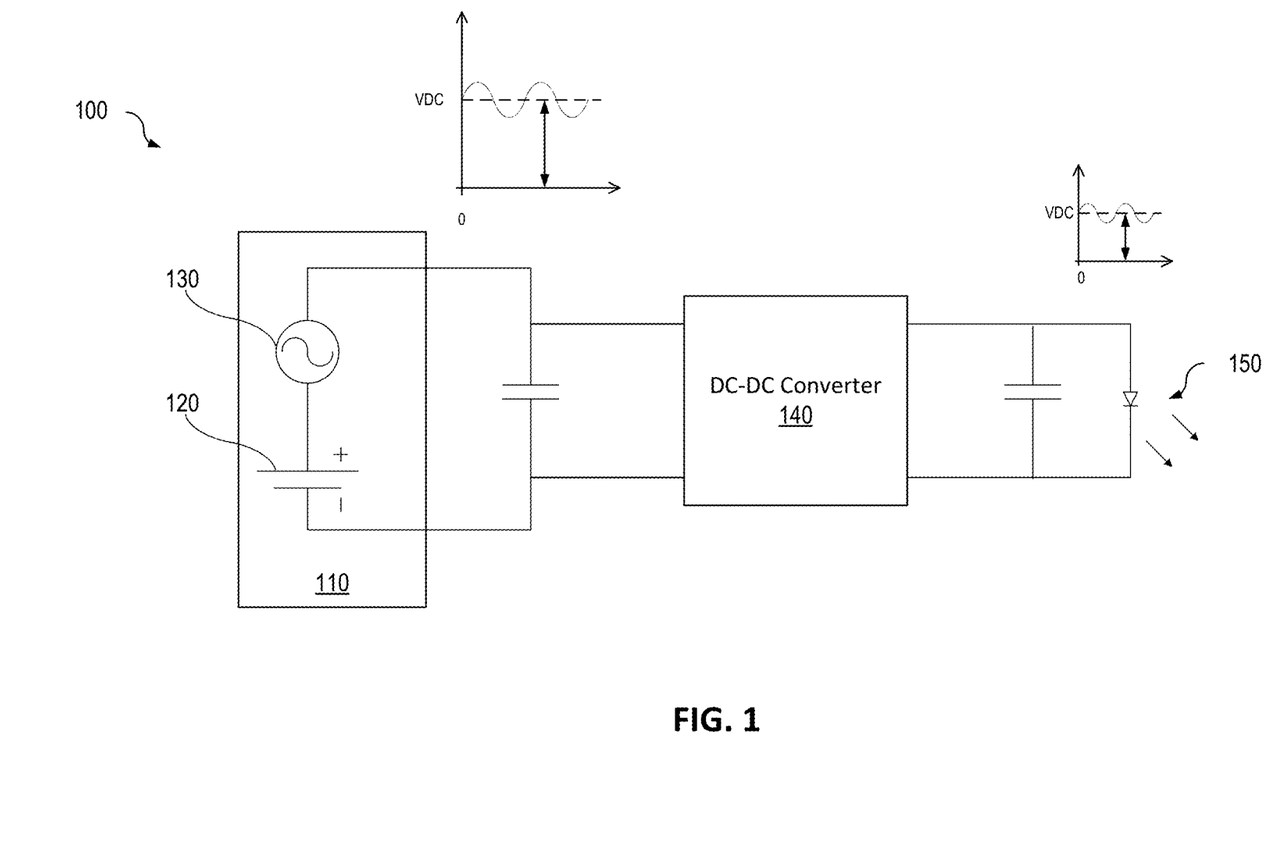
FIG. 1 is a block diagram illustrating an example of a typical power supply configuration for an LED luminaire.

FIG. 1 is a block diagram illustrating an example of a typical power supply configuration 100 for an LED luminaire. As illustrated in FIG. 1, the output of a rectification and power factor correction section 110 of an AC-to-DC power supply is DC power 120 with an AC ripple component 130. This low frequency ripple will appear at twice the frequency of the AC power (e.g., 120 Hz ripple for 60 Hz AC power) due to rectification by the power supply. The AC ripple component 130 is also present at a lower amplitude on the voltage and current output of the DC-DC converter 140 that provides the regulated power for the LED elements 150.

Figure 2:
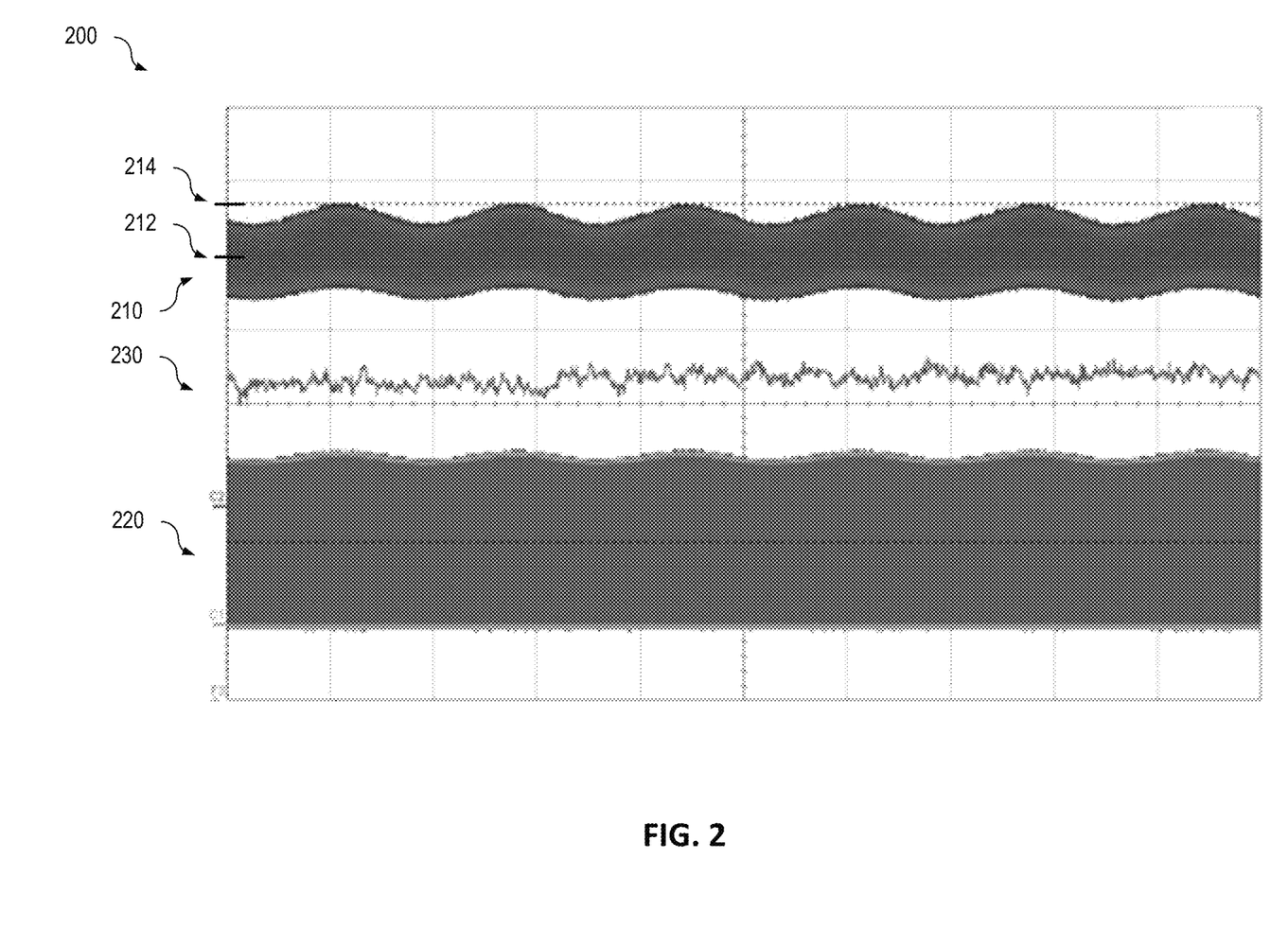
FIG. 2 is representative plot showing the DC output current, switching frequency of a power converter, and switching frequency tracking of the power converter.

FIG. 2 is representative plot 200 showing the DC output current 210, the switching frequency 220 of the power converter, and the switching frequency tracking 230 of the power converter. As shown in FIG. 2, ripple related to the AC power frequency appears on the DC output current 210. FIG. 2 illustrates that for an average DC output current 212 of approximately 1.689 amps with a maximum DC output current 214 of approximately 2.04 amps resulting from the low frequency ripple, the output ripple current is approximately 20.78% of the DC output current 210. Also, the switching frequency tracking 230 is not correlated to the ripple on the DC output current 210 output. It can be seen in FIG. 2 that while the ripple appears on the DC output current 210, the switching frequency of the DC-DC converter remains substantially constant as indicated by the plot of switching frequency tracking 230.

Output ripple current of a light-emitting diode (LED) driver can cause flickering of the LED light output. While the flickering may be imperceptible to the human eye, there is evidence that the brain can detect the flicker frequencies and that the flickering may cause health related affect such as headaches, eyestrain, and in some cases, epileptic seizures. In addition, the ripple current that can negatively affect the life of the LED itself. Since an LED is a diode, current can only flow in one direction through an LED.

Ripple current can decrease the LED light output as well as increase the power dissipation of the LED resulting in higher junction temperatures and reduced LED life. A rise in internal temperature during operation can lead to a rise in current and an increase in power dissipation within the LED, which in turn leads to a further increase in temperature. Failing to limit this repetitive cycle can lead to the destruction of the LED. The low frequency ripple may be reduced by using a filter capacitor, for example an electrolytic capacitor or a supercapacitor, across the rectifier bridge of the power supply. However, the filter capacitor is typically large and expensive. Degradation or failure of the filter capacitor could reduce the life expectancy of the power supply.

SUMMARY

Systems and methods for reducing current ripple at an output of a power supply are provided.

According to various aspects there is provided a method for reducing current ripple at an output of a power supply. In some aspects, the method may include sensing an alternating current (AC) input voltage waveform; determining a correction factor for a switching frequency of the power supply based on the sensed AC input voltage; and applying the correction factor to the switching frequency of the power supply to modify the power supply switching frequency. A modification of the switching frequency may synchronize the switching frequency of the power supply to the AC input voltage waveform.

According to various aspects there is provided a power supply. In some aspects, the power supply may include a direct current-direct current (DC-DC) converter; and a processor configured to control the DC-DC converter. The processor may be configured to: sense an alternating current (AC) input voltage waveform; determine a correction factor for a switching frequency of the power supply based on the sensed AC input voltage; and apply the correction factor to the switching frequency of the power supply to modify the switching frequency of the power supply. A modification of the switching frequency may synchronize the switching frequency of the power supply to the AC input voltage waveform.

According to various aspects there is provided a non-transitory computer readable medium. In some aspects, the non-transitory computer readable medium may include instructions for making one or more processors execute a method for reducing current ripple at an output of a power supply. The processor executable instructions may include instructions for performing operations including: sensing an alternating current (AC) input voltage waveform; determining a correction factor for a switching frequency of the power supply based on the sensed AC input voltage; and applying the correction factor to the switching frequency of the power supply to modify the power supply switching frequency. A modification of the power supply switching frequency may synchronize the power supply switching frequency to the AC input voltage waveform.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

LED lighting is increasingly replacing traditional incandescent lamps. A power supply configured to power the LED lighting, also referred to as a driver, may convert AC power provided by an electric utility to direct current (DC) power to drive the LED lighting elements, also referred to as an LED engine. Residual low frequency AC ripple at twice the frequency of the AC power (e.g., 120 Hz ripple for 60 Hz AC power) may appear on the DC power output for the LED engine. Output ripple current of a light-emitting diode (LED) driver can cause flickering of the LED light output as well as increase the power dissipation of the LED resulting in higher junction temperatures and reduced LED life. Industrial lighting standards typically limit a combination of high and low frequency ripple to prevent LED engine degradation.

Aspects of the present disclosure can provide apparatuses and methods for reducing the low frequency output ripple of a power supply such as, but not exclusively for, an LED driver.

The DC-DC converter of an LED driver may be a resonant converter. The control circuitry of the resonant converter controls the switching frequency of the converter to cause the switching elements to switch at near zero voltage and current conditions. The control circuitry may adjust the switching frequency of the resonant converter based on changes to the load on the output of the converter; however, the switching frequency may not be adjusted based on the output variations caused by low frequency ripple. The additional adjustments to the switching frequency can be provided to compensate for the output variations due to low frequency ripple. These additional shifts in the switching frequency corresponding to the low frequency ripple can reduce the output ripple current provided to the LED engine by the DC-DC converter.

According to some aspects of the present disclosure, a processor may include an algorithm programmed in firmware of the processor or stored in other non-volatile storage to cause the processor to control the power supply to reduce ripple on the output current to the load, for example, the LED engine. Reducing the output ripple in this manner may also reduce the amount of filter capacitance used to conform the output current ripple with applicable standards.

Figure 3:
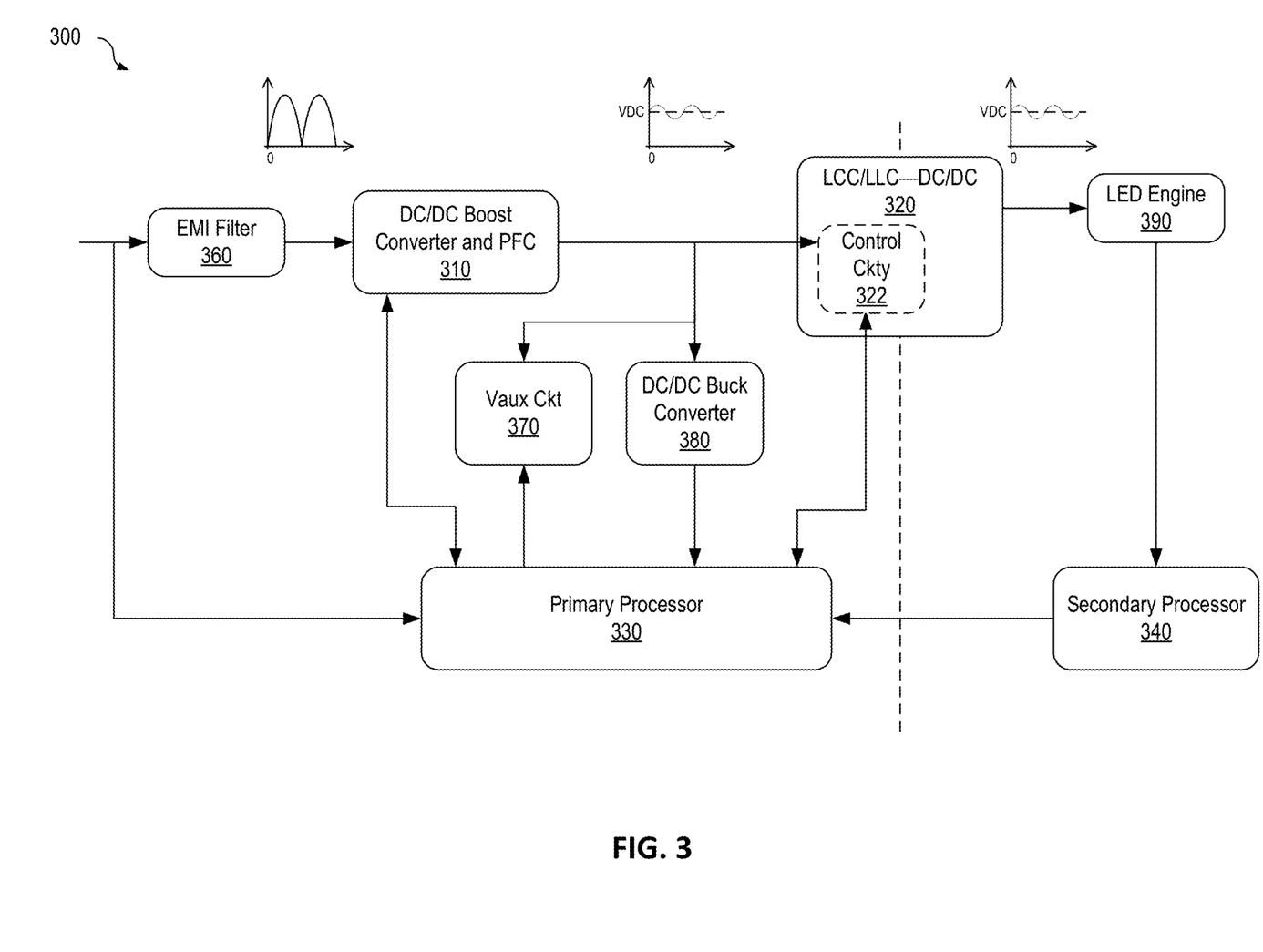
FIG. 3 is a block diagram illustrating a power supply according to some aspects of the present disclosure.

FIG. 3 is a block diagram illustrating a power supply 300 according to some aspects of the present disclosure. Referring to FIG. 3, the power supply 300 may include a primary DC-DC converter 310, a secondary DC-DC converter 320, a primary processor 330, and a secondary processor 340. The primary DC-DC converter 310 may be, for example, a DC-DC boost converter or other power supply configured to receive the rectified AC input voltage. The primary DC-DC converter 310 may provide power factor correction to the rectified AC input voltage and provide a regulated DC output voltage to the secondary DC-DC converter 320.

The secondary DC-DC converter 320 may be a resonant converter, for example, a half-bridge resonant buck converter or other resonant converter. The secondary DC-DC converter 320 may receive the regulated DC output voltage from the primary DC-DC converter 310 and provide output current to an LED engine 390 at a lower DC output voltage. The control circuitry 322 of the secondary DC-DC converter 320 (e.g., the resonant converter) controls the switching frequency of the secondary DC-DC converter 320 to cause the switching elements to switch at near zero voltage across and current through the switching elements. The control circuitry 322 may adjust the switching frequency of the resonant converter based on changes to the load on the output of the converter.

The primary processor 330 may be a microprocessor, microcomputer, computer, microcontroller, programmable controller, or other programmable device. The primary processor 330 may include one or more analog-to-digital (A/D) converters (not shown). The A/D converters may be configured to receive signals related to various operational parameters of the power supply 300, for example, but not limited to, amplitude measurements of the AC input voltage waveform. The primary processor 330 may provide power factor correction (PFC) control, total harmonic distortion (THD) correction, AC input ripple sensing, secondary DC-DC converter 320 control, as well as overall control of the power supply 300 (e.g., LED driver).

The secondary processor 340 may be a microprocessor, microcomputer, computer, microcontroller, programmable controller, or other programmable device. The secondary processor 340 may include one or more analog-to-digital (A/D) converters (not shown). The A/D converters may be configured receive signals related to various operational parameters of the power supply 300. The secondary processor 340 may provide control for the LED engine 390. The secondary processor 340 may sense the output current drawn by the LED engine 390 and provide feedback signals to the primary processor 330.

The power supply 300 may also include additional components such as an electromagnetic interference EMI filter 360, auxiliary circuitry 370, and a bias power supply 380. The EMI filter 360 may include capacitors and/or inductors (not shown) and can suppress electromagnetic noise conducted through wiring or cables. The EMI filter 360 may also include a rectifier (not shown), for example a rectifier bridge, to rectify the AC input voltage. The auxiliary circuitry 370 may be a power supply, for example, a buck converter, or other power supply. The auxiliary circuitry 370 may receive the regulated DC output voltage from the primary DC-DC converter 310 and may be configured to provide multiple lower output voltages (e.g., 12V, 20V, 24V, or another voltage) as power to various components of the power supply 300 (e.g., LED driver).

The bias power supply 380 may be, for example, but not limited to, a low voltage power supply (LVPS) such as a DC-DC buck converter or other LVPS. The bias power supply 380 may receive the regulated DC output voltage from the primary DC-DC converter 310 and may be configured to provide a lower output voltage (e.g., 3.3 V or another voltage) to the primary processor 330 and other low voltage integrated circuits.

According to some aspects of the present disclosure, a processor, for example the primary processor 330, may include instructions for one or more algorithms programmed in firmware of the processor or stored in other non-volatile storage to cause the processor to control the primary DC-DC converter (e.g., the primary DC-DC converter 310) of the power supply 300 to reduce ripple on the output current to the load (e.g., the LED engine 390).

The one or more algorithms may be configured to cause the primary processor 330 to apply a frequency shift to the switching frequency of the resonant converter of the primary DC-DC converter 310. For example, the primary processor 330 may generate a control signal to the control circuitry 322 of the secondary DC-DC converter 320 to cause a frequency shift of the resonant converter switching frequency. The frequency shift can cause the switching frequency to synchronize with the AC input voltage waveform. Based on the switching frequency of the resonant tank, the resonant elements (e.g., inductors and capacitors), and the input voltage, the output current for the LED engine can be adjusted. For example, a reduction of the AC input voltage may cause a reduction in the output current to the LED engine. Reducing the switching frequency may increase the output current. Similarly, an increase in the output current for the LED engine caused by an increase in AC input voltage may be compensated by increasing the switching frequency. Synchronizing the resonant converter switching frequency with the AC input voltage waveform can cancel or compensate the low frequency ripple on the output current signal.

According to some aspects of the present disclosure, the primary processor 330 may sample the AC input voltage waveform. The primary processor 330 may sample the AC input voltage waveform a specified number of times over one period of the input AC signal sine wave. The primary processor 330 may sample the AC input voltage waveform a different number of times without departing from the scope of the present disclosure.

For each sample of the AC input voltage waveform (e.g., sine wave), the primary processor 330 may apply a frequency correction factor to shift the switching frequency of the resonant converter of the primary DC-DC converter 310. For example, the primary processor 330 may adjust the signals to the switching elements for the resonant converter of the primary DC-DC converter 310. The frequency shift can cause the switching frequency of the resonant converter to synchronize with the AC sine wave.

The AC input voltage waveform may be sampled a predetermined number of times, for example, 64 times or another number of times, during each period between zero crossings of the AC input voltage waveform. At each sample, a frequency correction factor for adjusting the resonant converter switching frequency that minimizes output current ripple of the resonant converter may be determined and stored in a look-up table (LUT). The frequency correction factor may be a percentage change in the nominal switching frequency of the switching elements in the resonant converter. For example, for a nominal switching frequency of 100 kHz, a frequency correction factor of 1% would change the switching frequency to 101 kHz. Similarly, a frequency correction factor of −1% would change the switching frequency to 99 kHz.

The frequency correction factors for each sample of the AC input voltage waveform may be predetermined correction factors stored in a look-up table (LUT). The frequency correction factors may be experimentally determined and populated in the LUT during production of the power supply 300. The frequency correction factors may be specific to component values used for the power supply 300. The determined frequency correction factors may be programmed at the factory for each device manufactured with the component values used during the experimental determination.

The LUT may be implemented in the program code for the primary processor 330 as a static table containing the frequency correction factors for each of the predetermined number of samples of the AC input voltage waveform. For example, the LUT may be programmed in firmware of the primary processor 330 or stored in other non-volatile storage. The values for the frequency correction factors in the LUT may be pre-calculated and embedded in the program as an array of constants and may be compiled with the program code for the primary processor 330. The frequency correction factors may be expressed as a value suitable for implementation in the LUT used by the primary processor 330. For example, the frequency correction factor may be a multiplier for the nominal switching frequency expressed as a power of two.

While the power supply 300 is operating, the primary processor 330 may sample the AC input voltage waveform during each period and retrieve a corresponding frequency correction factor for the time sample of the AC input voltage waveform from the LUT. The primary processor 330 may apply the frequency correction factor to the switching elements of the resonant converter of the primary DC-DC converter 310 to shift the switching frequency of the resonant converter, thereby synchronizing the resonant converter switching with the AC input voltage waveform.

Figure 4:
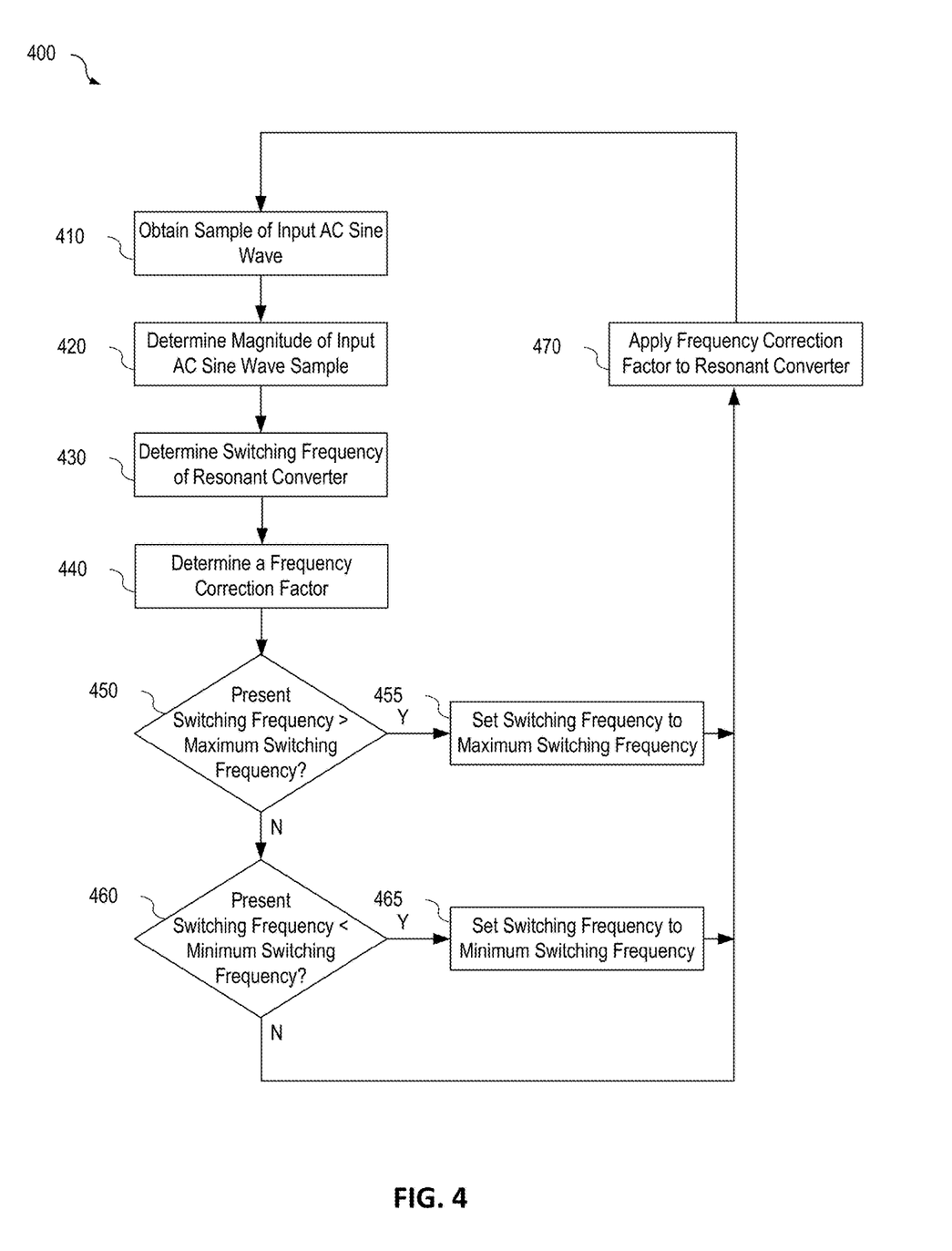
FIG. 4 is a flowchart illustrating an example of an algorithm for determining and applying frequency correction factors according to some aspects of the present disclosure.

Upon startup of the power supply 300, the primary processor 330 may determine the zero crossings of the AC input voltage waveform during the first several cycles of the AC input voltage. During each period of the AC input voltage waveform (e.g., the sine wave), the one or more algorithms may search the LUT for the frequency correction factor to apply. FIG. 4 is a flowchart illustrating an example of an algorithm 400 for determining and applying frequency correction factors according to some aspects of the present disclosure. Referring to FIG. 4, at block 410, a sample of the AC input voltage waveform may be obtained. For example, the primary processor 330 may obtain a sample of the input AC sine wave. The sample of the AC input voltage waveform may be obtained by the processor using one or more A/D converters. The processor may obtain a sample of the AC input voltage waveform a predetermined number of times, for example, 64 times or another number of times, during each period between zero crossings of the AC input voltage waveform.

At block 420, the magnitude of the AC input voltage waveform sample may be determined. The processor may determine the magnitude of the AC input voltage waveform sample as a digital value obtained from the one or more A/D converters.

At block 430, the switching frequency of the resonant converter may be determined. The processor may provide a control signal to the power supply (e.g., the primary DC-DC converter 310) to control the switching frequency of the resonant converter. The processor may determine the switching frequency of the resonant converter based on a characteristic of the control signal, for example, the magnitude or another characteristic of the control signal. For example, the processor may set the switching frequency in the resonant tank to obtain the target steady state current.

At block 440, the frequency correction factor may be determined. The processor may search a LUT for a frequency correction factor. The LUT may contain a frequency correction factor corresponding to each sample of the predetermined number of samples of the AC input voltage waveform. For each sample of the AC input voltage waveform obtained during each period between zero crossings of the input AC sine wave, the processor may search the LUT for a frequency correction factor corresponding to the obtained sample of the AC input voltage waveform.

At block 450, it may be determined whether the present switching frequency of the resonant converter is greater than a maximum switching frequency. A maximum switching frequency for the resonant converter may be specified based on the design (e.g., maximum/minimum input voltage, maximum/minimum output power, selected passive components, etc.) of the resonant converter. In response to determining that the present switching frequency is greater than the maximum switching frequency (450-Y), at block 455 the switching frequency of the resonant converter may be set to the maximum switching frequency. For example, the processor may set the switching frequency of the resonant converter to the maximum switching frequency.

At block 470, the frequency correction factor may be applied to the resonant converter switching frequency. The processor may apply a control signal to the power supply (e.g., the primary DC-DC converter 310) to change the switching frequency of the resonant converter. The process may continue at block 410 with the next sample of the AC input voltage waveform.

In response to determining that the present switching frequency is not greater than the maximum switching frequency (450-N), at block 460 it may be determined whether the present switching frequency of the resonant converter is less than a minimum switching frequency. A minimum switching frequency for the resonant converter may be specified based on the design (e.g., maximum/minimum input voltage, maximum/minimum output power, selected passive components, etc.) of the resonant converter. In response to determining that the present switching frequency is less than the minimum switching frequency (460-Y), at block 465 the switching frequency of the resonant converter may be set to the minimum switching frequency. For example, the processor may set the switching frequency of the resonant converter to the minimum switching frequency.

In response to determining that the present switching frequency is not less than the minimum switching frequency (460-N), at block 470, the frequency correction factor may be applied to the resonant converter switching frequency. The processor may apply a control signal to the power supply (e.g., the primary DC-DC converter 310) to change the switching frequency of the resonant converter. The process may continue at block 410 with the next sample of the AC input voltage waveform.

The algorithm 400 may be embodied on a non-transitory computer readable medium, for example, but not limited to, the memory or firmware (not shown) for the primary processor 330 or other non-transitory computer readable medium known to those of skill in the art, having stored therein a program including computer executable instructions for making a processor, computer, or other programmable device execute the operations of the method.

The specific steps illustrated in FIG. 4 provide a particular method for determining and applying frequency correction factors according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 4 may include multiple sub-operations that may be performed in various sequences as appropriate to the individual operation.

Figure 5:
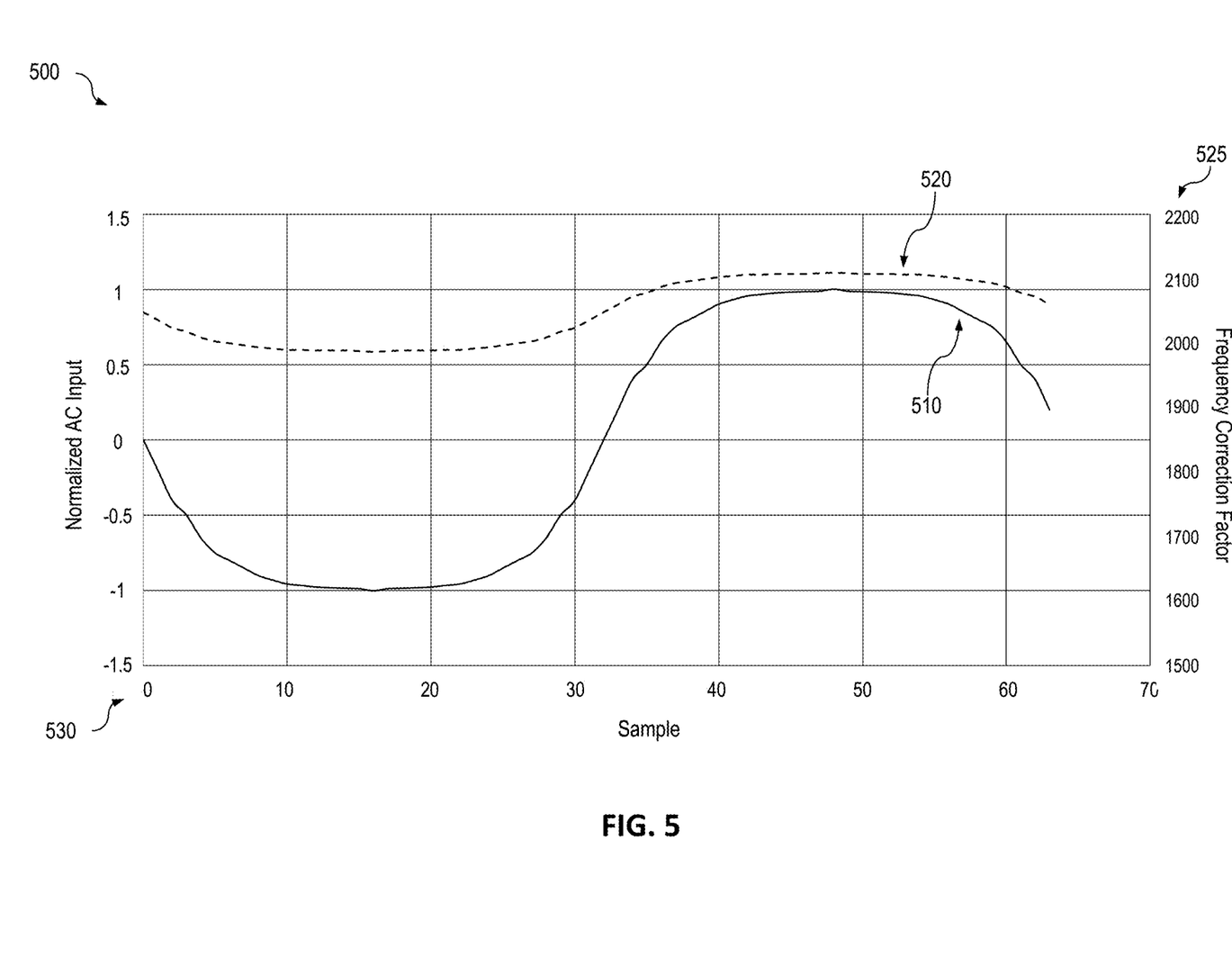
FIG. 5 is a graph illustrating an example of a plot of a normalized input AC voltage sine wave and a corresponding plot of frequency correction factors according to some aspects of the present disclosure.

The pre-calculated frequency correction factors in the LUT should match AC input voltage waveform samples to provide proper compensation of the signal. FIG. 5 is a graph 500 illustrating an example of a plot of a normalized AC input voltage waveform 510 and a corresponding plot 520 of frequency correction factors 525 according to some aspects of the present disclosure. As illustrated in FIG. 5, the AC input voltage waveform 510 may not be a perfect sine wave. As illustrated in FIG. 5, a frequency correction factor 525 for the resonant converter switching frequency may be applied at each sample 530 of the AC input voltage waveform 510 to substantially synchronize the resonant converter switching frequency with the AC input voltage waveform 510. FIG. 5 illustrates the frequency correction factors 525 as decimal representations of binary values which may be interpreted by the processor to provide the appropriate correction to the resonant converter switching frequency. Other representations of the correction factors may be used without departing from the scope of the present disclosure.

Using an LUT can reduce processing time. The savings in terms of processing time can be significant, since retrieving a value from memory is often faster than undergoing an "expensive" computation. The AC input voltage waveform sample values may be feed into function to act as look-up key to select the appropriate frequency correction factors to properly shift the frequency of the resonant converter. The function may take the AC input voltage and sample timing related to an angle of the sinusoidal input voltage to calculate a key index. Other functions may be utilized to generate the lookup key without departing from the scope of the present disclosure.

Figure 6:
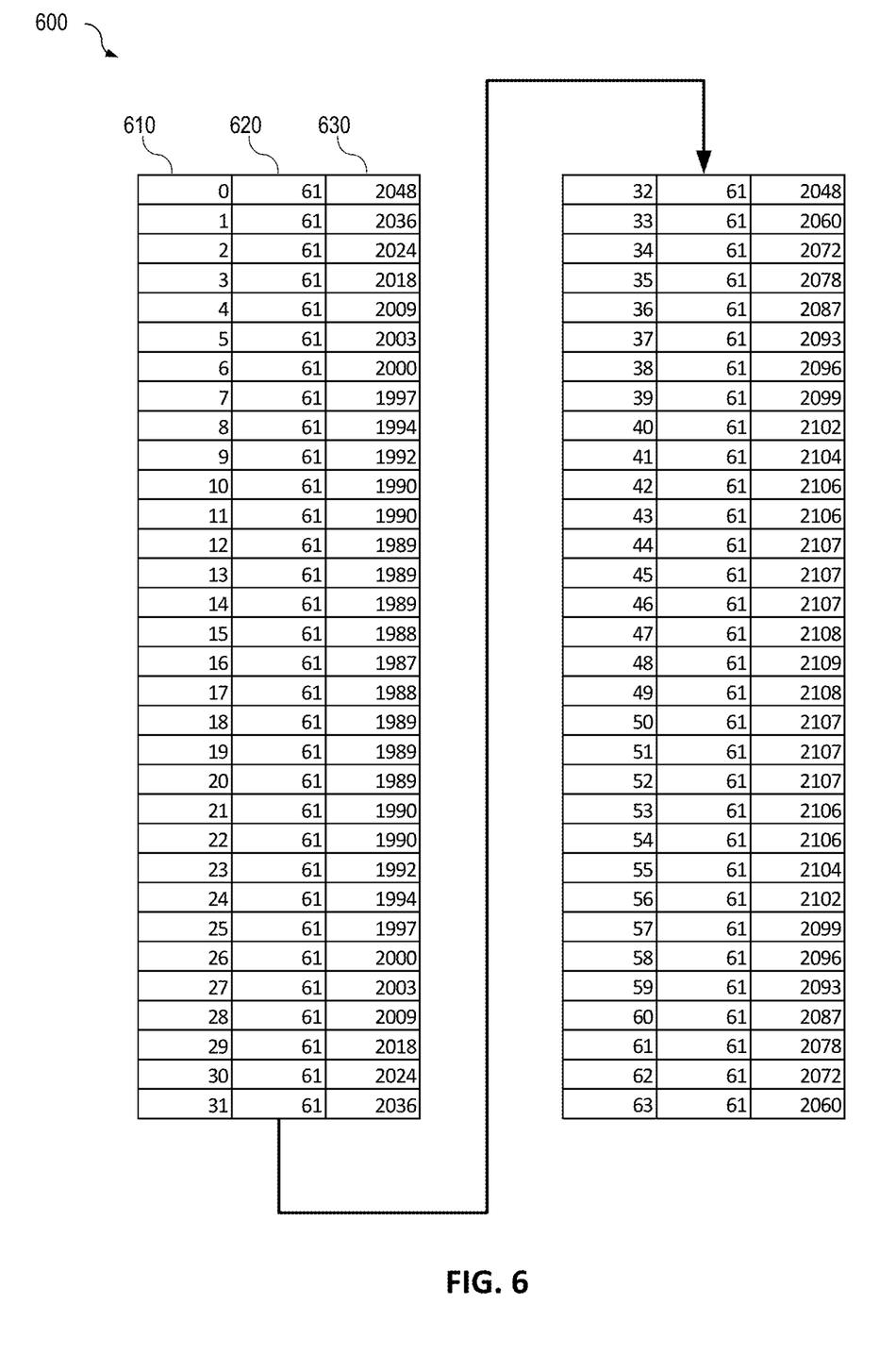
FIG. 6 illustrates an example of a look-up table (LUT) according to some aspects of the present disclosure.

FIG. 6 illustrates an example of an LUT 600 according to some aspects of the present disclosure. The values for the frequency correction factors in the LUT may be pre-calculated during production of the power supply and may be specific to the components used to manufacture the power supply. The LUT may be a pre-calculated table and may be accessible to the processor. For example, the LUT may be programmed into firmware for the processor.

Referring to FIG. 6, the first column 610 of the LUT 600 may indicate the sample numbers of the AC input voltage waveform with the AC input voltage waveform being sampled 64 times (e.g., samples 0-63) during one period of the AC input voltage waveform. Sample numbers 0 and 32 correspond to the zero crossings during one period of the AC input voltage waveform. The second column 620 may indicate a minimum frequency correction factor. The third column 630 may represent frequency correction factors as decimal representations of binary values which may be interpreted by the processor. Other formats of the LUT may be used without departing from the scope of the present disclosure.

The frequency correction factors may be determined by calibration iterations for the power supply and may be based on a measured reduction in output current ripple. The resulting correction factors may depend on various factors such as tolerances from passive components of the power supply. Once the correction factors are determined, they may remain the same for each power supply manufactured with the same configuration of components. The frequency correction factors in the third column 630 may correspond to the plot 520 of frequency correction factors in FIG. 5.

While FIGS. 5 and 6 illustrate an AC input voltage waveform sampled 64 times during one period and 64 corresponding frequency correction factors, more of fewer AC input voltage waveform samples and corresponding frequency correction factors may be used without departing from the scope of the present disclosure.

Figure 7:
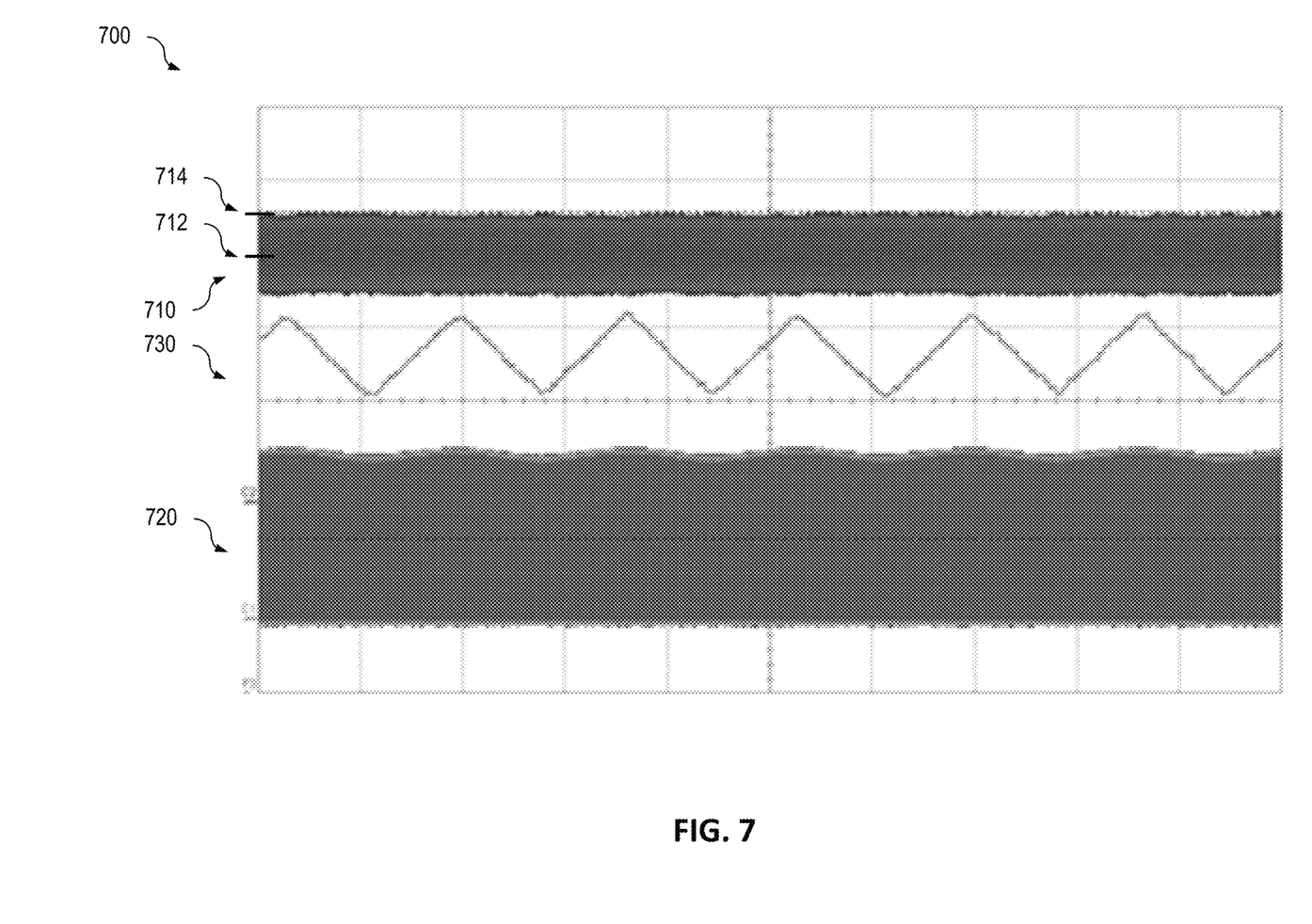
FIG. 7 is representative plot showing the DC output current, switching frequency of a power converter, and switching frequency tracking of the power converter according to some aspects of the present disclosure.

FIG. 7 is representative plot 700 showing the DC output current 710, the switching frequency 720 of a power converter, and the switching frequency tracking 730 of the power converter according to some aspects of the present disclosure. Based on the switching frequency of the resonant tank, the resonant elements (e.g., inductors and capacitors), and the input voltage, the output current for the LED engine a be adjusted. For example, when the input voltage to the resonant tank is reduced (for example, below 120 V AC) the output current will also decrease. In order to maintain the output current the switching frequency may be decreased.

The switching frequency 720 plot represents the switching frequency showing the 120 Hz oscillation. As illustrated by the switching frequency tracking 730 plot, when the crest of the 120 Hz oscillation is reached, the switching frequency is increased, and when the trough of the 120 Hz oscillation is reached the switching frequency is reduced, therefore the average output current is maintained and the ripple caused by the 120 Hz oscillation is reduced.

FIG. 7 illustrates that for an average DC output current 712 of approximately 1.686 amps with a maximum DC output current 714 of approximately 2 amps resulting from the low frequency ripple, the output ripple current is approximately 18.6% of the DC output current 710. The switching frequency tracking 730 tracks the control signal to the resonant converter corresponding to changes in switching frequency of the resonant converter. Comparing the plot of the DC output current 710 and the plot of the switching frequency tracking 730 with the plot of the DC output current 210 and the plot of the switching frequency tracking 730 in FIG. 2, it can be seen that modifying the switching frequency of the resonant converter according to aspects of the present disclosure reduces the low frequency ripple on the DC output current 710 for the same value of filtering capacitance (e.g., 68 μF) as used in the measurements obtained in FIG. 2.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for reducing current ripple at an output of a power supply, the method comprising:
    sensing an alternating current (AC) input voltage sine waveform;
    determining a correction factor for a switching frequency of the power supply based on the sensed AC input voltage; and
    applying the correction factor to the switching frequency of the power supply to modify the power supply switching frequency,
    wherein a modification of the switching frequency synchronizes the switching frequency of the power supply to the AC input voltage sine waveform.

2. The method of claim 1, wherein sensing the AC input voltage sine waveform comprises obtaining a specified number of samples of an amplitude of the AC input voltage sine waveform over at least one period of the AC input voltage sine waveform.

3. The method of claim 2, wherein the specified number of samples is 64 samples, and wherein the specified number of samples is obtained between zero crossings of the at least one period of the AC input voltage sine waveform.

4. The method of claim 1, wherein determining the correction factor comprises selecting a predetermined correction factor corresponding to the sensed AC input voltage sine waveform from a look-up table.

5. The method of claim 1, wherein applying the correction factor comprises changing a control signal to control circuitry of the power supply, wherein the control circuitry controls a switching frequency of switching elements of the power supply.

6. The method of claim 1, wherein the power supply comprises a resonant converter.

7. The method of claim 1, wherein the power supply is a light emitting diode (LED) driver.

8. A power supply, comprising:
    a direct current-direct current (DC-DC) converter; and
    a processor configured to control the DC-DC converter, wherein the processor is configured to:
        sense an alternating current (AC) input voltage sine waveform;
        determine a correction factor for a switching frequency of the power supply based on the sensed AC input voltage; and
        apply the correction factor to the switching frequency of the power supply to modify the switching frequency of the power supply,
        wherein a modification of the switching frequency synchronizes the switching frequency of the power supply to the AC input voltage sine waveform.

9. The power supply of claim 8, wherein the processor is further configured to sense the AC input voltage sine waveform by obtaining a specified number of samples of an amplitude of the AC input voltage sine waveform over at least one period of the AC input voltage sine waveform.

10. The power supply of claim 9, wherein the specified number of samples is 64 samples, and
    wherein the specified number of samples is obtained between zero crossings of the at least one period of the AC input voltage sine waveform.

11. The power supply of claim 8, wherein the processor is further configured to determine the correction factor by selecting a predetermined correction factor corresponding to the sensed AC input voltage sine waveform from a look-up table (LUT).

12. The power supply of claim 11, further comprising non-volatile storage, wherein the LUT is stored in the non-volatile storage.

13. The power supply of claim 8, wherein the DC-DC converter comprises control circuitry configured to control a switching frequency of switching elements of the DC-DC converter, and wherein the control circuitry is further configured to apply the correction factor based on a control signal received from the processor.

14. The power supply of claim 8, wherein the power supply comprises a resonant converter.

15. The power supply of claim 8, wherein the power supply is a light emitting diode (LED) driver.

16. A non-transitory computer readable medium having stored therein instructions for making one or more processors execute a method for reducing current ripple at an output of a power supply, the processor executable instructions comprising instructions for performing operations including:
    sensing an alternating current (AC) input voltage sine waveform;

determining a correction factor for a switching frequency of the power supply based on the sensed AC input voltage; and applying the correction factor to the switching frequency of the power supply to modify the power supply switching frequency, wherein a modification of the power supply switching frequency synchronizes the power supply switching frequency to the AC input voltage sine waveform.

17. The non-transitory computer readable medium as defined in claim 16, wherein sensing the AC input voltage sine waveform comprises instruction for performing operations including obtaining a specified number of samples of an amplitude of the AC input voltage sine waveform over at least one period of the AC input voltage sine waveform.

18. The non-transitory computer readable medium as defined in claim 17, wherein the specified number of samples is 64 samples, and wherein the specified number of samples is obtained between zero crossings of the at least one period of the AC input voltage sine waveform.

19. The non-transitory computer readable medium as defined in claim 16, wherein determining the correction factor comprises instruction for performing operations including selecting a predetermined correction factor corresponding to the sensed AC input voltage sine waveform from a look-up table.

20. The non-transitory computer readable medium as defined in claim 16, wherein applying the correction factor comprises instruction for performing operations including changing a control signal to control circuitry of the power supply, wherein the control circuitry controls a switching frequency of switching elements of the power supply.

* * * * *